July 3, 1928.  M. S. LEE  1,675,565

SAW

Filed Oct. 9, 1925

WITNESS:
Gust. Hjelm

INVENTOR:
M. S. Lee
H. J. Sanders
ATTORNEY

Patented July 3, 1928.

1,675,565

UNITED STATES PATENT OFFICE.

MATHIAS SYVERSEN LEE, OF SEATTLE, WASHINGTON.

SAW.

Application filed October 9, 1925. Serial No. 61,473.

This invention relates to improvements in saws and its object is to provide a saw that can be used both as a cross cut and rip saw. A further object is to provide a saw of simple construction, positive and efficient in use and cheap to manufacture.

With the foregoing and other objects in view the invention consists in the combination and arrangement of parts to be hereinafter fully described, pointed out in the appended claim and illustrated in the accompanying drawing which forms a part of this application and in which—

Like reference characters denote corresponding parts throughout the several views.

Figures 1, 2, 3:
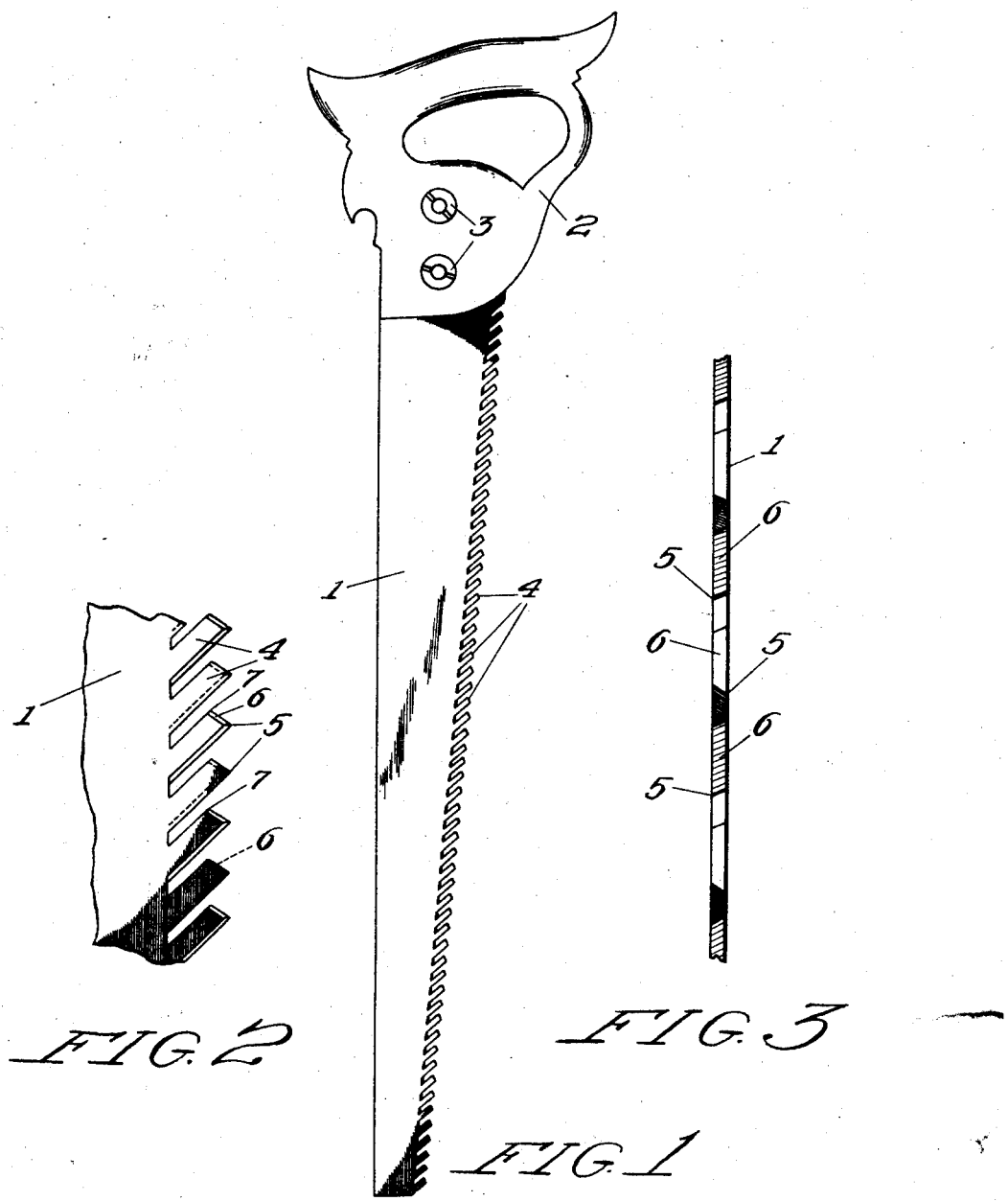
Fig. 1 is a plan view of the saw.
Fig. 2 is an enlarged fragmentary view of the blade.
Fig. 3 is an edge view of Fig. 2.

The reference numeral 1 denotes the blade to which the handle 2 is detachably secured by the screws 3. The blade is formed along its cutting edge with the teeth 4 which are spaced apart in the usual manner but are not offset with relation to each other. The several teeth are all disposed in a common plane with the blade and are inclined at a 45 degree angle to the handle.

Each tooth is formed with a point 5 and the free or cutting edge 6 is beveled rearwardly or toward the handle to the point 7, alternate teeth having their opposite edges and ends beveled as shown by Figure 3 of the drawing.

What is claimed is:—

A hand saw having a blade provided on one edge with a series of evenly spaced teeth, each of said teeth having parallel rear and front edges, said teeth being parallel each to the others and inclined uniformly toward the handle end of the blade, the front edges of all of the teeth terminating at equal distances from the body of the blade and the ends of the teeth being disposed at slightly less than a right angle with respect to the front edges, the end edges and front edges of the teeth being beveled with the bevels of adjacent teeth facing opposite sides of the saw.

In testimony that I claim the foregoing as my own I have hereto affixed my signature.

MATT. SYVERSEN LEE.